United States Patent
Tsai

(10) Patent No.: US 8,461,802 B2
(45) Date of Patent: Jun. 11, 2013

(54) WIRELESS DRIVER SYSTEM

(75) Inventor: Ming-Chiu Tsai, Taipei County (TW)

(73) Assignee: Fu Da Tong Technology Co., Ltd., Chung-Ho, Taipei County (TW)

( * ) Notice: Subject to any disclaimer, the term of this patent is extended or adjusted under 35 U.S.C. 154(b) by 282 days.

(21) Appl. No.: 12/966,551

(22) Filed: Dec. 13, 2010

(65) Prior Publication Data

US 2011/0215757 A1 Sep. 8, 2011

(30) Foreign Application Priority Data

Mar. 2, 2010 (TW) .............................. 99203716 U

(51) Int. Cl.
*H02J 7/00* (2006.01)
*H01F 27/42* (2006.01)

(52) U.S. Cl.
USPC .......................................... 320/108; 307/104

(58) Field of Classification Search
USPC .......................................... 320/108; 307/104
See application file for complete search history.

(56) References Cited

U.S. PATENT DOCUMENTS

| 4,837,516 | A * | 6/1989 | Takahashi | 324/322 |
| 8,096,939 | B2 * | 1/2012 | Forsell | 600/30 |
| 2009/0284082 | A1 * | 11/2009 | Mohammadian | 307/104 |
| 2011/0101790 | A1 * | 5/2011 | Budgett | 307/104 |

* cited by examiner

*Primary Examiner* — M'Baye Diao
(74) *Attorney, Agent, or Firm* — Muncy, Geissler, Olds & Lowe, PLLC

(57) ABSTRACT

A wireless driver system includes a mobile power supply module consisting of a transmitter-receiver coil, a resonant circuit, a charging circuit assembly, a power supply circuit assembly, a signal generator circuit, a power storage unit, a microprocessor and a voltage sensing circuit and controllable to transmit an electrical energy and a control signal wirelessly to a driver, and a driver consisting of a receiver coil, a resonant circuit, a signal sensing circuit, a power-receiving circuit, a microprocessor, a motor driver circuit and a driving mechanism and adapted for receiving the electrical energy and control signal from the mobile power supply module for switching the driving mechanism between two opposing positions.

8 Claims, 3 Drawing Sheets

WIRELESS DRIVER SYSTEM

BACKGROUND OF THE INVENTION

This new application claims the priority benefit of Taiwan patent application number 099203716, filed on Mar. 2, 2010.

1. Field of the Invention

The present invention relates to wireless control technology and more particularly, to a wireless driver system, which comprises a driver and a mobile power supply module controllable to transmit an electrical energy and a control signal to the driver to drive the driver at a distance.

2. Description of the Related Art

In many mechanical, electrical or electronic equipment, a driving mechanism is used and switchable between two opposing positions to achieve different effects. For example, by means of reciprocating or moving the driving mechanism, the system or electronic equipment is driven to keep working or to pause. Further, the driving mechanism of, for example, a door lock can be controlled by a key or switch button to switch between a locking position and an unlocking position. However, it is inconvenient to frequently open or close the lock of the gate of an apartment or public building where people go in and out frequently. Further, the latch of the door lock of the gate of an apartment or public building may be electrically driven by a motor subject to the control of a control button. However, in case of power failure, the control button becomes not operable. Therefore, the use of an electrically controlled door lock has the following drawbacks:

1. The control button of an electrically controlled door lock may be provided at a remote plate or inside a house. It is inconvenient to approach to the control button. Further, in case of a contact error or electrical line failure, the door lock becomes inoperable.

2. In case of power failure, the control button become not operable, and the user must use a key or directly operate the manual switch to open the door lock.

Therefore, it is desirable to provide a measure that eliminates the problem of the aforesaid complicated driving mechanism or door lock operation method and the non-operable problem of the aforesaid conventional driving mechanism or door lock upon a power failure.

SUMMARY OF THE INVENTION

The present invention has been accomplished under the circumstances in view. It is one object of the present invention to provide a wireless driver system, which facilitates the control of a driving mechanism of an equipment or door lock in a wireless manner. It is one object of the present invention to provide a wireless driver system, which facilitates the control of a driving mechanism of an equipment or door lock in a wireless manner, even during city power failure.

To achieve this and other objects of the present invention, a wireless driver system includes a mobile power supply module consisting of a transmitter-receiver coil, a resonant circuit, a charging circuit assembly, a power supply circuit assembly, a signal generator circuit, a power storage unit, a microprocessor and a voltage sensing circuit and controllable to transmit an electrical energy and a control signal wirelessly to a driver, and a driver consisting of a receiver coil, a resonant circuit, a signal sensing circuit, a power-receiving circuit, a microprocessor, a motor driver circuit and a driving mechanism and adapted for receiving the electrical energy and control signal from the mobile power supply module for switching the driving mechanism between two opposing positions.

Further, the mobile power supply module can be used in a mobile telephone, remote controller, wireless intercom, or any of a variety of mobile electronic devices. Further, the driver can be used in a door lock or any of a variety of mechanical devices.

DETAILED DESCRIPTION OF THE PREFERRED EMBODIMENT

Figure 1:
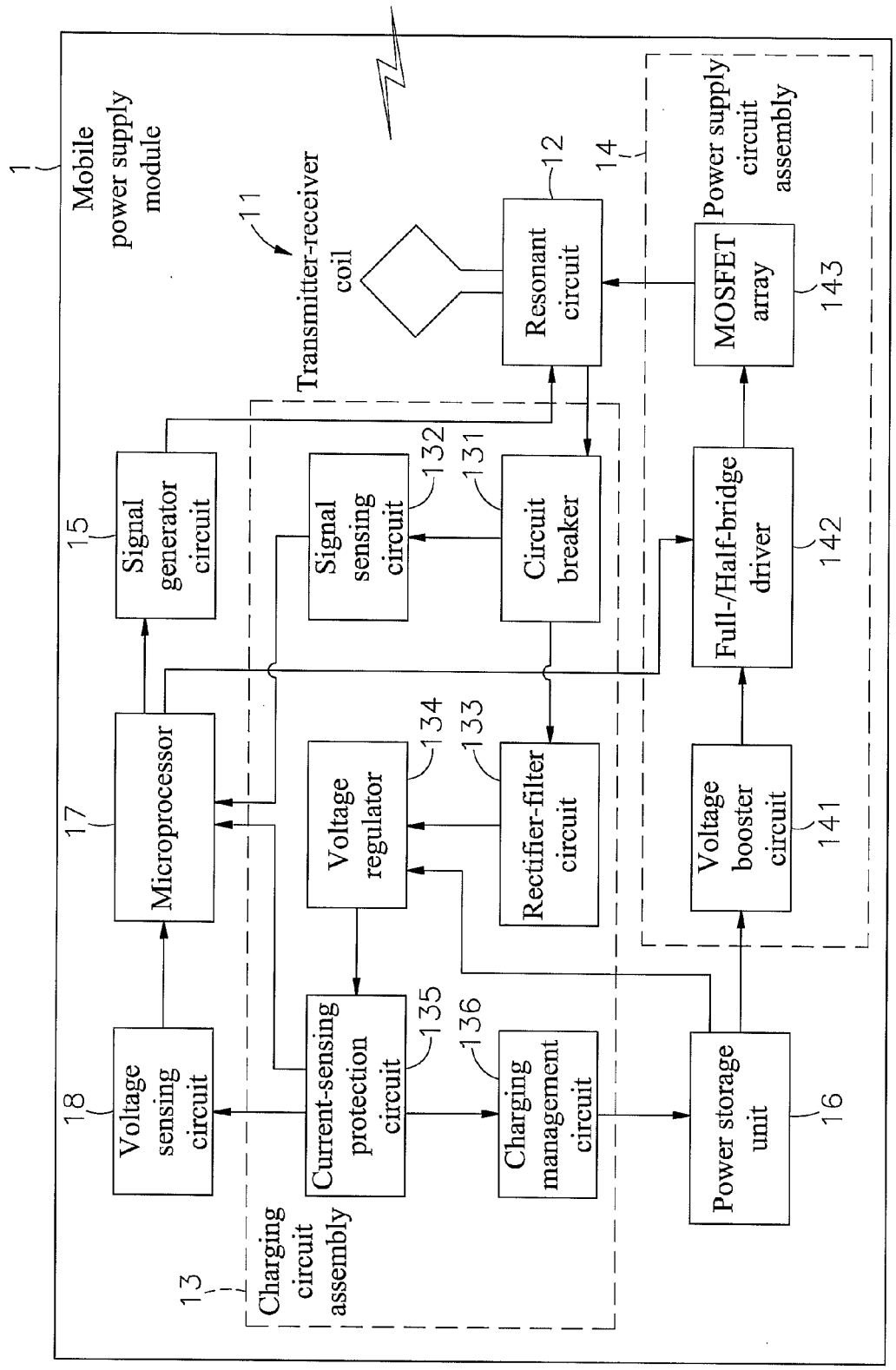
FIG. 1 is a circuit block diagram of a mobile power supply module for wireless driver system in accordance with the present invention.
Figure 2:
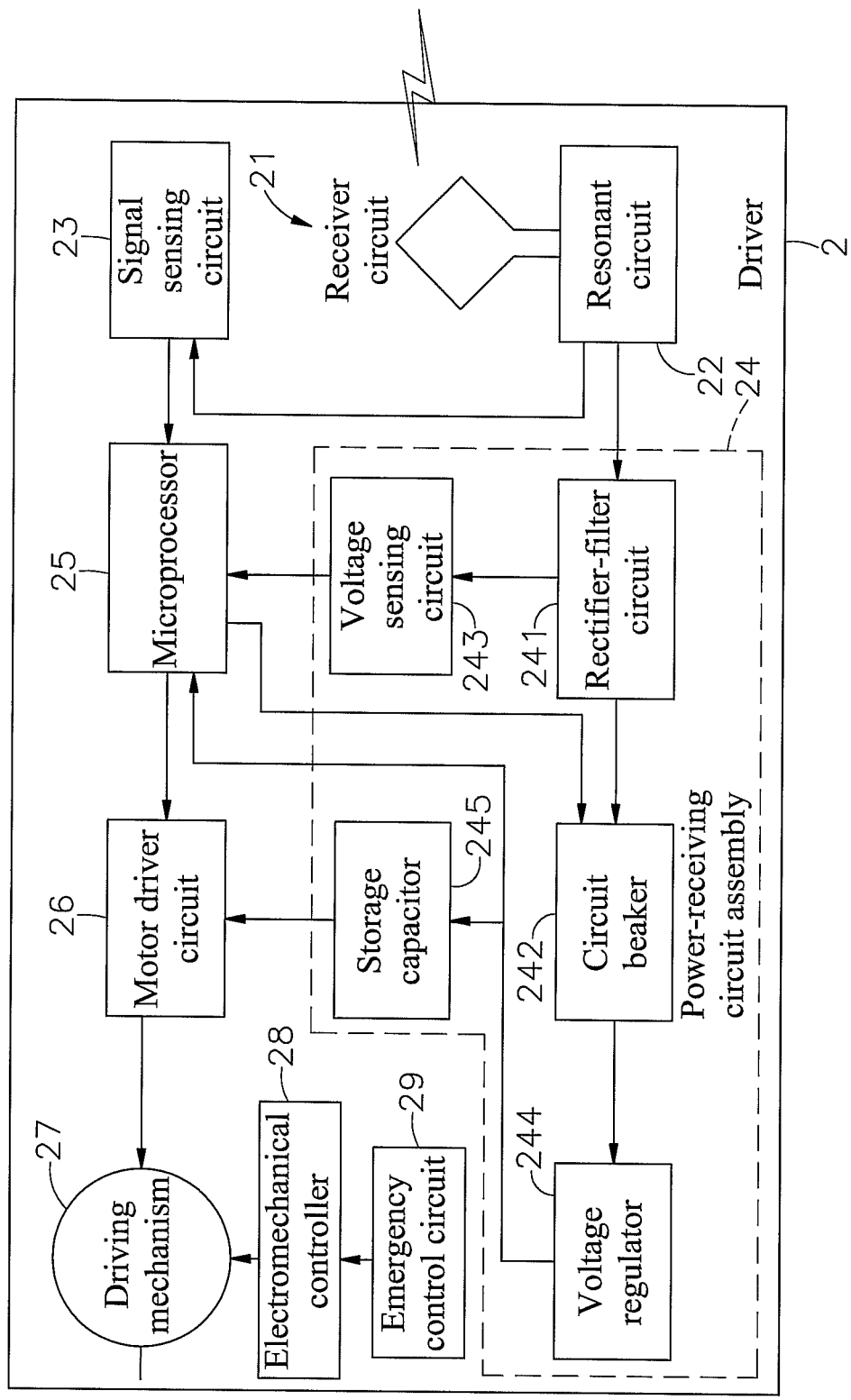
FIG. 2 is a circuit block diagram of a driver for wireless driver system in accordance with the present invention.
Figure 3:
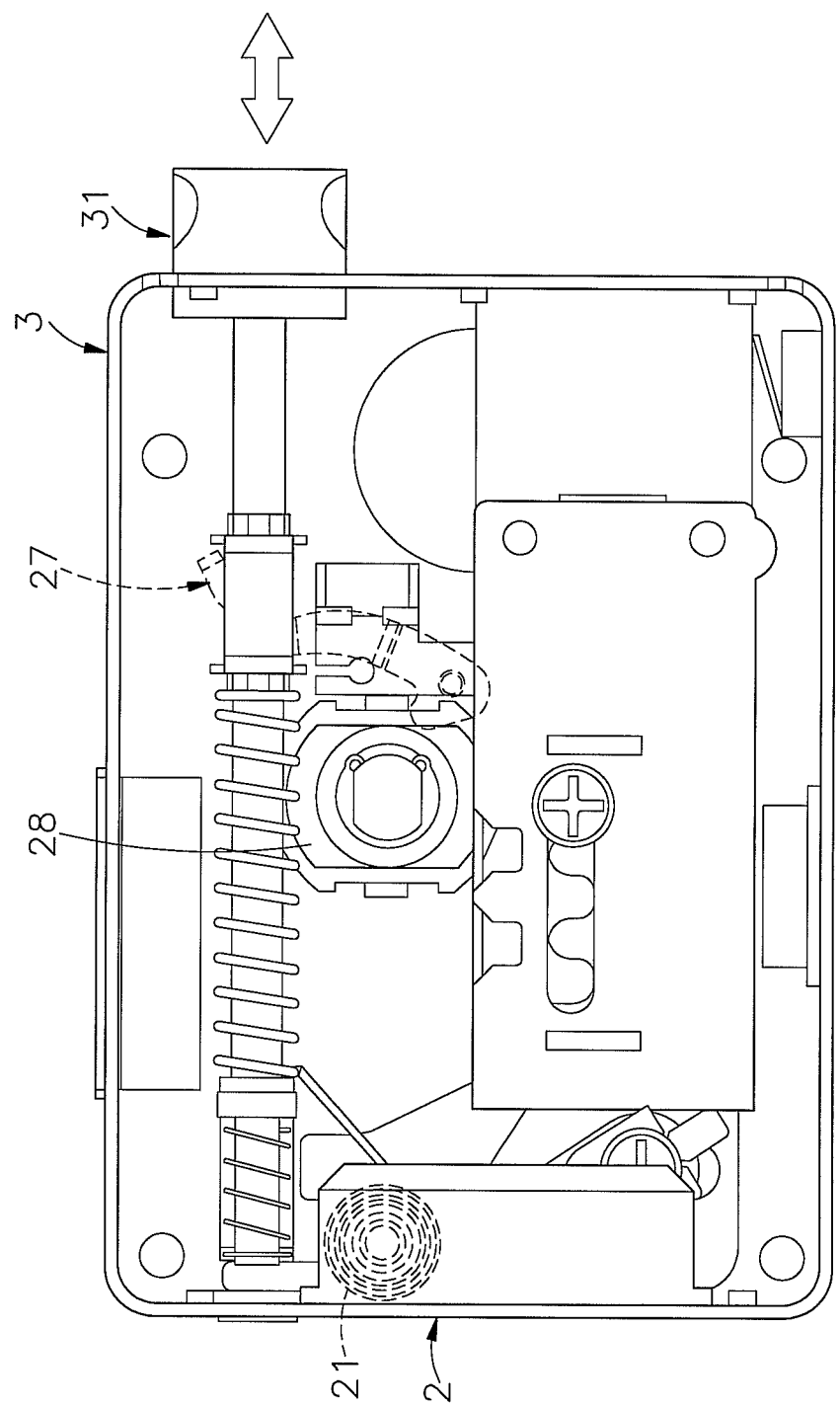
FIG. 3 is a schematic sectional view of an application example of the present invention, illustrating the driver installed in a lock.

Referring to FIGS. 1~3, a wireless driver system in accordance with the present invention is shown comprising a mobile power supply module 1 and a driver 2.

The mobile power supply module 1 comprises a transmitter-receiver coil 11 adapted for transmitting and receiving electrical energy and wireless control signal, a resonant circuit 12 electrically connected with the transmitter-receiver coil 11, a charging circuit assembly 13 electrically connected with the resonant circuit 12, a power supply circuit assembly 14 electrically connected with the resonant circuit 12, a signal generator circuit 15 electrically connected with the resonant circuit 12, a power storage unit 16 electrically connected with the charging circuit assembly 13 and the power supply circuit assembly 14, a microprocessor 17 electrically connected with the signal generator circuit 15 and the charging circuit assembly 13 and a voltage sensing circuit 18 electrically connected with the microprocessor 17 and the charging circuit assembly 13.

The driver 2 comprises a receiver coil 21 adapted for receiving an external electrical energy and control signal, a resonant circuit 22 electrically connected with the receiver coil 21, a signal sensing circuit 23 electrically connected with the receiver coil 21, a power-receiving circuit assembly 24 electrically connected with the resonant circuit 22, a microprocessor 25 electrically connected with the signal sensing circuit 23 and the power-receiving circuit assembly 24, a motor driver circuit 26 electrically connected with the microprocessor 25 and the power-receiving circuit assembly 24, a driving mechanism 27 electrically connected with the motor driver circuit 26, an electromechanical controller 28 electrically connected with the driving mechanism 27 and an emergency control circuit 29 electrically connected with the electromechanical controller 28. The emergency control circuit 29 is manually operable to drive the electromechanical controller 28 in switching the driving mechanism 27.

In actual practice, the mobile power supply module 1 transmits an electrical energy and a wireless control signal to the receiver coil 21 of the driver 2 through the transmitter-receiver coil 11. The receiver coil 21 of the driver 2 transmits the received electrical energy to the power-receiving circuit assembly 24 and received control signal from the signal sensing circuit 23 respectively. After through rectification, filtration and voltage stabilization processing processes, the power-receiving circuit assembly 24 provides a voltage signal to the microprocessor 25 and the motor driver circuit 26. At the same time, the signal sensing circuit 23 transmits the control signal, after through demodulation and analysis, to the microprocessor 25, enabling the microprocessor 25 to control the operation of the motor driver circuit 26 in using the received electrical energy from the power-receiving circuit assembly 24 to move the driving mechanism 27 between, for example, On and Off, Open and Close, or, locking and unlocking positions. Thus, by means of the mobile power supply module 1 to transmit the electrical energy and wireless control signal, the driving mechanism 27 of the driver 2 is wirelessly controlled to move between two opposing positions.

The aforesaid mobile power supply module 1 can be installed in a mobile telephone, remote controller or wireless intercom. Further, the charging circuit assembly 13 of the mobile power supply module 1 comprises a circuit breaker 131 electrically connected with the resonant circuit 12, a signal sensing circuit 132 electrically connected in series between the circuit breaker 131 and the microprocessor 17, a rectifier-filter circuit 133 electrically connected with the circuit breaker 131, a voltage regulator 134 electrically connected with the rectifier-filter circuit 133 and the power storage unit 16, a current-sensing protection circuit 135 electrically connected with the voltage regulator 134 and the voltage sensing circuit 18, and a charging management circuit 136 electrically connected in series between the current-sensing protection circuit 135 and the power storage unit 16. Further, the power storage unit 16 is a storage battery or rechargeable battery.

During charging operation, the transmitter-receiver coil 11 of the mobile power supply module 1 receives the electrical energy from an external power source means wirelessly (this wireless electrical energy transmitting technology is of the known art and not within the scope of the invention, no further detailed description is this regard will be necessary). At this time, the transmitter-receiver coil 11 transmits the received electrical energy to the resonant circuit 12 and then to the circuit breaker 131 of the charging circuit assembly 13. At this time, the circuit breaker 131 determines the received electrical energy to be of the charging mode or transmitting mode, and then provides a determination result signal to the signal sensing circuit 132 and transmits the electrical energy to the rectifier-filter circuit 133. Upon receipt of the control signal from the transmitter-receiver coil 11, the signal sensing circuit 132 transmits the control signal to the microprocessor 17. Upon receipt of the electrical energy, the rectifier-filter circuit 133 converts the electrical energy from AC to DC, and then transmits the DC electrical energy to the voltage regulator 134, enabling the voltage regulator 134 to provide a stabilized voltage to the current-sensing protection circuit 135 and the microprocessor 17 in case of the charging mode, or to the microprocessor 17 only in case of the power-supplying mode (i.e., the transmitting mode). At this time, the current-sensing protection circuit 135 monitors the electric current at every circuit node in the mobile power supply module 1. If the electric current is abnormal, the current-sensing protection circuit 135 stops the charging operation of the charging circuit assembly 13. If the electric current is normal, the charging management circuit 136 charges the power storage unit 16 with the DC electrical energy.

Further, the power supply circuit assembly 14 comprises a voltage booster circuit 141 adapted for receiving the discharged electrical energy from the power storage unit 16, a half-/full-bridge driver 142 electrically connected to the output terminal of the voltage booster circuit 141 and a MOSFET array 143 electrically connected with the half-/full-bridge driver 142 and the resonant circuit 12.

During the discharging mode (power-supplying mode) of the mobile power supply module 1, the power storage unit 16 discharges an electrical energy to the half-/full-bridge driver 142 through the voltage booster circuit 141, causing the half-/full-bridge driver 142 to drive the MOSFET array 143, so that the MOSFET array 143 can drive the transmitter-receiver coil 11 to oscillate and to transmit the electrical energy outwardly. Thus, the transmitter-receiver coil 11 can receive an electrical energy as well as transmit an electrical energy. Subject resonance matching of the functioning of the resonant circuit 12, the transmitter-receiver coil 11 can receive an external electrical energy and transmit an internal electrical energy smoothly.

Further, the microprocessor 17 of the mobile power supply module 1 has built therein a charging/discharging management software, and can monitor system voltage at every circuit node by means of the voltage sensing circuit 18 during operation of the mobile power supply module 1. In case of any abnormality, the microprocessor 17 immediately stops the operation of the mobile power supply module 1. Further, during the electrical energy transmitting mode of the mobile power supply module 1, the microprocessor 17 triggers the signal generator circuit 15 to provide a coded signal and to mix the signal into the electrical energy at the resonant circuit 12 for further transmitting through the transmitter-receiver coil 11 to the power-receiving end (i.e., the driver 2), assuring a high lever of safety and high security.

Further, the driver 2 can be an electrically controlled lock or electrically controlled switch; the driving mechanism 27 can be the latch of an electrically controlled lock or the switching lever of an electrically controlled switch.

The power-receiving circuit assembly 24 of the driver 2 comprises a rectifier-filter circuit 241 electrically connected with the resonant circuit 22, a circuit breaker 242 electrically connected with the rectifier-filter circuit 241, a voltage sensing circuit 243 electrically connected in series between the rectifier-filter circuit 241 and the microprocessor 25, a voltage regulator 244 electrically connected with the circuit breaker 242 and the microprocessor 25 and a storage capacitor 245 electrically connected with the voltage regulator 244 and the motor driver circuit 26.

By means of the receiver coil 21, the driver 2 can receive the electrical energy and the control signal from the mobile power supply module 1. After through matching and resonanting processes, the resonant circuit 22 transmits the received electrical energy from the receiver coil 21 to the power-receiving circuit assembly 24, enabling the electrical energy to be converted from AC to DC by the rectifier-filter circuit 241. The DC electrical energy is then transmitted through the circuit breaker 242 and the voltage regulator 244 to the storage capacitor 245 and the microprocessor 25. During the transmission of the electrical energy through the power-receiving circuit assembly 24, the voltage sensing circuit 243 monitors the voltage at every circuit node in the driver 2 and will immediately stops the operation of the driver 2 in case of any voltage abnormality; the circuit break 242 detects any external abnormal electromagnetic interference and will immediately cut off the power supply transmission loop upon detection of an external abnormal electromagnetic interference. Thus, the voltage regulator 244 can provide a stabilized voltage to the storage capacitor 245 and the microprocessor 25. Further, the resonant circuit 22 transmits the received control signal to the signal sensing circuit 23 for decoding and analyzing (so that any non-qualified external signal or noise will be denied, assuring high security). After recognition, the signal sensing circuit 23 transmits the control signal to the microprocessor 25. After receipt of the control signal from the signal sensing circuit 23 and the signal from the power-receiving circuit assembly 24, the microprocessor 25 immediately drives the motor driver circuit 26 to transmit the electrical energy received from the power-receiving circuit assembly 24 to the driving mechanism 27, thereby moving the driving mechanism 27 from the open (or Off or unlocking) position to the close (or On or locking) position, or from the close (or On or locking) position to the open (or Off or unlocking) position. In the application example shown in FIG. 3, the driver 2 is used in an electrically controlled lock 3 where the driving mechanism 27 is adapted for moving the latch 31 of the electrically controlled lock 3 between the locking position and the unlocking position. Thus, the mobile power supply module 1 can transmit an electrical energy and a control signal to the driver 2 wirelessly, controlling the driver 2 to move the driving mechanism 27 between the On and Off positions, open and close positions, or locking and unlocking position. Thus, the user can operate mobile power supply module 1 to control the operation of the driver 2 wirelessly, even during city power failure.

Further, during normal use of the driver 2, the electromechanical controller 28 is controllable by the manually operated emergency control circuit 29 (an indoor control button or a manual button at the driver 2) to switch the driving mechanism 27. In case of city power failure, the user can operate the mobile power supply module 1 to provide an electrical energy and a control signal to the driver 2, thereby switching the driving mechanism 27 from the open (or Off or unlocking) position to the close (or On or locking) position, or from the close (or On or locking) position to the open (or Off or unlocking) position.

As indicated above, the invention provides a wireless driver system, which comprises a mobile power supply module 1 and a driver 2, wherein the mobile power mobile power supply module 1 comprises a transmitter-receiver coil 11 adapted for transmitting and receiving an electrical energy and a wireless control signal, a resonant circuit 12, a charging circuit assembly 13, a power supply circuit assembly 14, a signal generator circuit 15, a power storage unit 16, a microprocessor 17 and a voltage sensing circuit 18; the driver 2 comprises a receiver coil 21 adapted for receiving an external electrical energy and control signal, a resonant circuit 22, a signal sensing circuit 23, a power-receiving circuit assembly 24, a microprocessor 25, a motor driver circuit 26, a driving mechanism 27, an electromechanical controller 28 and an emergency control circuit 29. By means of the resonant circuit 12 and the charging circuit assembly 13, the power storage unit 16 can be charged with an external electrical energy received by the transmitter-receiver coil 11. Further, subject to the operation of the resonant circuit 12, the power supply circuit assembly 14, the signal generator circuit 15, the microprocessor 17 and the voltage sensing circuit 18, the mobile power supply module 1 is controllable to transmit an electrical energy and a control signal to the driver 2 wirelessly to drive the motor driver circuit 26 of the operation of the driver 2 in switching the driving mechanism 27 rapidly and efficiently, even during city power failure.

In conclusion, the invention provides a wireless driver system, which has the following advantages and features:

1. If the location of the driver 2, control button or control equipment is at a far place, the user can operate the mobile power supply module 1 to transmit an electrical energy and a control signal to the driver 2 wirelessly, thereby switching the driving mechanism 27 at a remote place.

2. In case of city power failure, the user can operate the mobile power supply module 1 to drive the driver 2 in switching the driving mechanism 27 at a distance without the use of a key or directly operating the emergency control circuit 29.

A prototype of wireless driver system has been constructed with the features of FIGS. 1~3. The wireless driver system works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wireless driver system, comprising:
a mobile power supply module, said mobile power supply module comprising,
   a transmitter-receiver coil adapted for transmitting and receiving an electrical energy and a wireless control signal,
   a first resonant circuit electrically connected with said transmitter-receiver coil,
   a charging circuit assembly electrically connected with the first resonant circuit,
   a power supply circuit assembly electrically connected with the first resonant circuit,
   a signal generator circuit electrically connected with the first resonant circuit,
   a power storage unit electrically connected with said charging circuit assembly and said power supply circuit assembly and chargeable by said charging circuit,
   a microprocessor electrically connected with said signal generator circuit and said charging circuit assembly and adapted for controlling said charging circuit to charge said power storage unit and said power supply circuit assembly to discharge an electrical energy from said power storage unit out to said transmitter-receiver coil through the first resonant circuit, and
   a voltage sensing circuit electrically connected with said microprocessor and said charging circuit assembly and adapted for sensing the voltage level at a predetermined circuit node in said mobile power supply module; and
a driver, said driver comprising,
   a receiver coil adapted for receiving an external electrical energy and control signal from said transmitter-receiver coil of said mobile power supply module,
   a second resonant circuit electrically connected with said receiver coil,
   a signal sensing circuit electrically connected with said receiver coil and adapted for analyzing and decoding the control signal received from said receiver coil through the second resonant circuit,
   a power-receiving circuit assembly electrically connected with the second resonant circuit and adapted for processing the electrical energy received from said receiver coil through the second resonant circuit,
   a microprocessor electrically connected with the signal sensing circuit and the power-receiving circuit assembly and adapted for receiving the electrical energy from said power-receiving circuit assembly and the control signal from said signal sensing circuit and controlling the operation of said power-receiving circuit assembly,
   a motor driver circuit electrically connected with said microprocessor and said power-receiving circuit assembly and controllable by the microprocessor of said driver, and a driving mechanism electrically connected with said motor driver circuit and movable by said motor driver circuit subject to the control of the microprocessor of said driver.

2. The wireless driver system as claimed in claim 1, wherein said mobile power supply module is installed in one of the group of mobile telephone, remote controller and wireless intercom.

3. The wireless driver system as claimed in claim 1, wherein said charging circuit assembly of said mobile power supply module comprises a circuit breaker electrically connected with the first resonant circuit, a signal sensing circuit electrically connected in series between said circuit breaker and the microprocessor of said mobile power supply module, a rectifier-filter circuit electrically connected with said circuit breaker, a voltage regulator electrically connected with said rectifier-filter circuit and said power storage unit, a current-sensing protection circuit electrically connected with said voltage regulator and said voltage sensing circuit, and a charging management circuit electrically connected in series between said current-sensing protection circuit and said power storage unit.

4. The wireless driver system as claimed in claim 1, wherein said power supply circuit assembly comprises a voltage booster circuit adapted for receiving the discharged electrical energy from said power storage unit, a half-/full-bridge driver electrically connected to the output terminal of said voltage booster circuit and a MOSFET array electrically connected with said half-/full-bridge driver and the first resonant circuit.

5. The wireless driver system as claimed in claim 1, wherein said power storage unit is a storage battery or rechargeable battery.

6. The wireless driver system as claimed in claim 1, wherein said driver is an electrically controlled lock or electrically controlled switch; said driving mechanism is the latch of an electrically controlled lock or the switching lever of an electrically controlled switch.

7. The wireless driver system as claimed in claim 1, wherein said power-receiving circuit assembly of said driver comprises a rectifier-filter circuit electrically connected with the second resonant circuit, a circuit breaker electrically connected with the rectifier-filter circuit of said driver, a voltage sensing circuit electrically connected in series between the rectifier-filter circuit and microprocessor of said driver, a voltage regulator electrically connected with the circuit breaker and microprocessor of said driver and a storage capacitor electrically connected with the voltage regulator of said driver and said motor driver circuit.

8. The wireless driver system as claimed in claim 1, wherein said driver further comprises an electromechanical controller electrically connected with said driving mechanism and an emergency control circuit electrically connected with said electromechanical controller and manually operable to drive said electromechanical controller in switching said driving mechanism.

* * * * *